United States Patent [19]

Thorn et al.

[11] Patent Number: 4,630,539
[45] Date of Patent: Dec. 23, 1986

[54] DEVICE FOR FLASH SUPPRESSION OF A ROCKET MOTOR

[75] Inventors: Lawrence B. Thorn, Madison; Robert E. Betts, Huntsville, both of Ala.

[73] Assignee: The United States of America as represented by the Secretary of the Army, Washington, D.C.

[21] Appl. No.: 747,742

[22] Filed: Jun. 24, 1985

[51] Int. Cl.⁴ .............................................. F42C 19/08
[52] U.S. Cl. .................................. 102/202; 60/39.823
[58] Field of Search .............. 102/202; 60/256, 39.823

[56] References Cited

U.S. PATENT DOCUMENTS

| | | | |
|---|---|---|---|
| 2,872,870 | 2/1959 | Gey | 102/202 |
| 2,995,088 | 8/1961 | Asplund | 102/202 |
| 3,129,561 | 4/1964 | Priapi | 60/39.823 |
| 3,170,287 | 2/1965 | Adelman | 102/202 |
| 4,391,196 | 7/1983 | Betts | 102/202 |

Primary Examiner—Charles T. Jordan
Attorney, Agent, or Firm—Freddie M. Bush; James T. Deaton

[57] ABSTRACT

A device in which a solid suppressant is ablated and dispensed into the gases of a main burning rocket motor in which a fast burning smokeless type solid propellant is burning to allow the suppressant to control afterburning of the gases from the burning solid propellant and the suppressant being dispensed by a sustained action igniter pyrotechnic that is also used to ignite the main motor solid propellant.

5 Claims, 11 Drawing Figures

DEVICE FOR FLASH SUPPRESSION OF A ROCKET MOTOR

DEDICATORY CLAUSE

The invention described herein may be manufactured, used, and licensed by or for the Government for governmental purposes without the payment to us of any royalties thereon.

BACKGROUND OF THE INVENTION

Current minimum smoke rocket motor solid propellants produce fuel rich exhaust products that combust or afterburn with air beyond the nozzle exit of the rocket motor. Such afterburning does not contribute to rocket motor thrust, is undesirable, and in many cases is unacceptable because it increases the radiation emission signature of the missile.

There are many documented approaches for the use of chemical means to suppress afterburning, however they have not been proven to be acceptable for accomplishing the desired results in afterburning. Depending upon the nature of the chemicals used, various previous methods have included: (1) the incorporation of the chemical suppressant into the main rocket motor propellant itself, (2) coating resonance rods with the chemical suppressants and placing them inside the rocket motor structure and (3) using ablative nozzle rings or sections in the rocket motor for providing suppressant for the rocket motor.

Many solid propellants that are used in these minimum smoke type solid propellants are chemically or otherwise incompatible with the suppressant so that direct incorporation into the minimum smoke solid propellant is not possible. In these prior devices, the ablative technique is ineffective and requires large amounts of suppressant that results in smoke signature. Therefore, it can be seen that a device or technique that is effective in eliminating or effectively controlling afterburning in a rocket motor is badly needed.

Accordingly, it is an object of this invention to provide a new device and technique for introducing chemical flash suppressants into a rocket motor through an igniter assembly for the main propellant of the rocket motor.

Another object of this invention is to provide an igniter for a solid propellant such that the igniter is designed to provide suppressant material that is ablated as a coating in a controlled fashion during sustained igniter burning.

Still another object of this invention is to provide a device which utilizes a technique of injecting material into a rocket motor cavity by means of a pyrogen igniter which has a controlled burning grain for injecting the material into the motor cavity as the pyrogen igniter burns.

A still further object of this invention is to provide arrangements of grain or pellet design for an igniter which incorporates both suppressant and pyrotechnics into each igniter gain or pellet for controlled introduction of suppressant into a rocket motor chamber that has a smokeless solid propellant burning therein.

Other objects and advantages of this invention will be obvious to those skilled in this art.

SUMMARY OF THE INVENTION

In accordance with this invention, a device for flash suppression of a rocket motor is provided that includes incorporating into the pyrotechnic for igniting the solid propellant of the rocket motor a suppressant material which is in direct contact with the pyrotechnic so that the suppressant is supplied in direct relation and in a very controlled manner relative to the burning of the pyrotechnic. Also, the suppressant material can be fabricated in various shapes and forms and still be in direct or intimate contact with the specific shapes of the pyrotechnic material and provide substantially the needed amount of the suppressant without providing an amount that is considerably more than that needed for suppressing the exhaust from the rocket motor.

DESCRIPTION OF THE PREFERRED EMBODIMENTS

This invention involves providing an arrangement for dispensing suppressant into a burning motor through an auxillary device as an igniter for the solid propellant of the rocket motor by venting to the rocket motor chamber and dispensing controlled amount of suppressant during rocket motor burning. The ˄ ˯un˙ ˙f suppressant dispensed by the auxillary ˅ ˳ device is controlled by the ablation rate of a suppressant incorprated into the igniter housing as an ingredient in intimate or direct contact with the pyrotechnic of the igniter.

Figure 1:
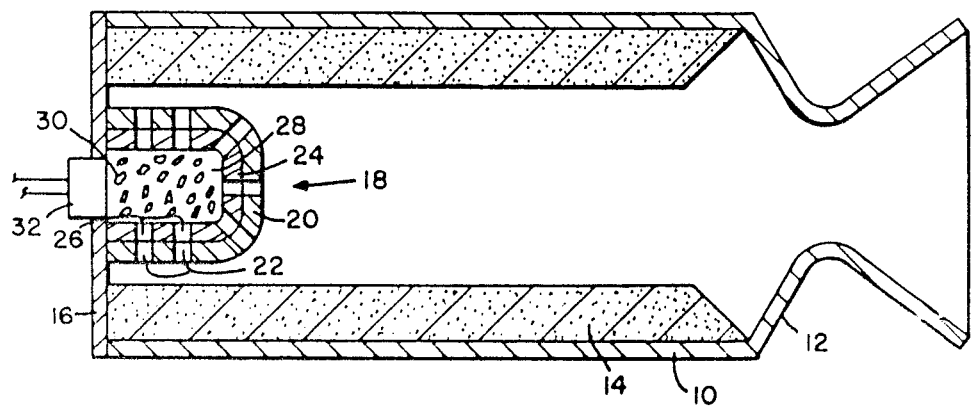
FIG. 1 is a sectional view of a rocket motor with a solid propellant therein and an igniter with ablative material in contact with the igniter material in accordance with this invention.

Referring now to the drawings for illustration of specific embodiments for carrying out this invention, in FIG. 1 a rocket motor case 10 is illustrated that has an exhaust nozzle 12 with a minimum smoke solid propellant main motor charge 14 mounted in the chamber defined within motor case 10. At the forward end 16 of rocket motor case 10 which is opposite nozzle end 12 a pyrotechnic igniter arrangement 18 is mounted. Pyrotechnic igniter arrangement 18 includes an igniter structural basket arrangement 20 with a multiplicity of ports 22 therethrough. An ablative solid material 24 is mounted on the innersurface of basket 20 and has ports 26 therethrough that correspond with ports 22 of basket 20. Ablative material 24 defines a chamber 28 with end structure 16 and chamber 28 contains igniter charge 30 in pellet or grain form that is designed for long sustained burning action with the charge being designed for igniting solid propellant 14 of the main motor and for ablating material 24 as charge 30 is burned. A conventional igniter 32 is utilized for igniting igniter charge 30 in a conventional manner.

In operation, with the elements mounted as illustrated, when igniter 32 is set off, igniter charges in pellet form 30 are caused to burn for sustained action burning and as charges 30 are ignited and produce gases and heat, this in turn ignites solid main motor propellant 14 and simultaneously with the igniting of charges 30 ablative material 24 is ablated to suppress fuel rich combustable gases that are produced from the burning of solid propellant 14 at its surface. With this type arrangement, solid propellant 14 is not altered by the suppressant since the solid propellant burns and produces its desired results at the surface of the solid propellant and ablative material 24 that is ablated by charges 30 as they are expended causes the proper suppressant to be mixed with the exhaust gases produced from the burning of propellant 14 and the ablative material performs its function of suppressing further burning of the main motor propellant gases as they are exhausted through nozzle 12.

Figure 2:
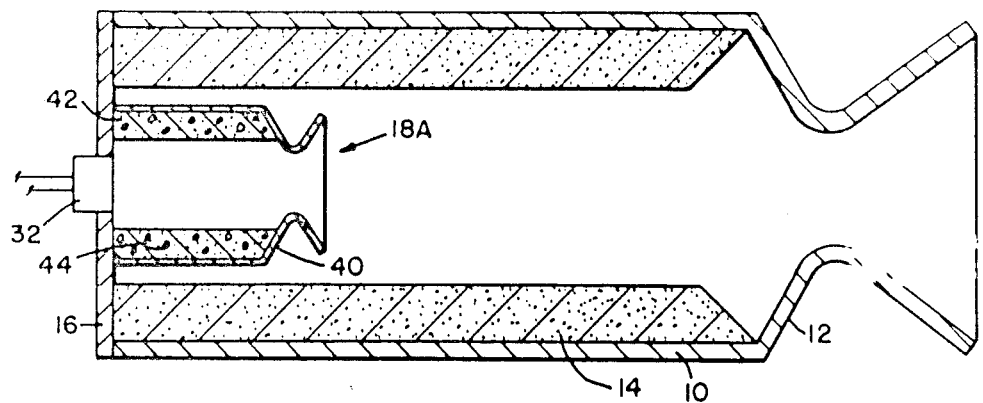
FIG. 2 is a sectional view of a rocket motor with a solid propellant and with an igniter in which the pyrotechnic charge has suppressant material intimately intermingled in the pyrotechnic.

Referring now to FIG. 2, wherein like elements are depicted by corresponding numbers to those noted in FIG. 1 and are not further described here. In FIG. 2 igniter arrangement 18A is utilized and includes a small rocket motor housing structure 40 that has a propellant dispensing (pyro) grain 42 into which small particles of suppressant 44 such as $K_2SO_4$ are dispersed. Propellant dispering grain 42 can be most any of the double base type propellants that include nitroglycerin and nitrocellulose that are used for pyrotechnic type grains of this type. These solid propellants are compatible with the suppressant material whereas the ingredients used in the main rocket motor propellant of solid propellant 14 are not always compatible with the suppressant and further adding the suppressant to the main motor solid propellant can effect the performance of the main motor solid propellant. Igniter 18A also has an initiator 32 for igniting propellant 42.

In operation of the arrangement of FIG. 2, initiator 32 is initiated to cause propellant 42 to be ignited as a pyrogen and produce the requirements for igniting solid rocket motor propellant 14. As propellant 42 burns suppressant 44 is released and ablated into a chamber of the main rocket motor and mixes with the gases from burning propellant 14 and therefore the fuel rich gas from solid rocket motor propellant 14 is suppressed and caused not to burn after passing through rocket motor nozzle 12.

Figure 3:
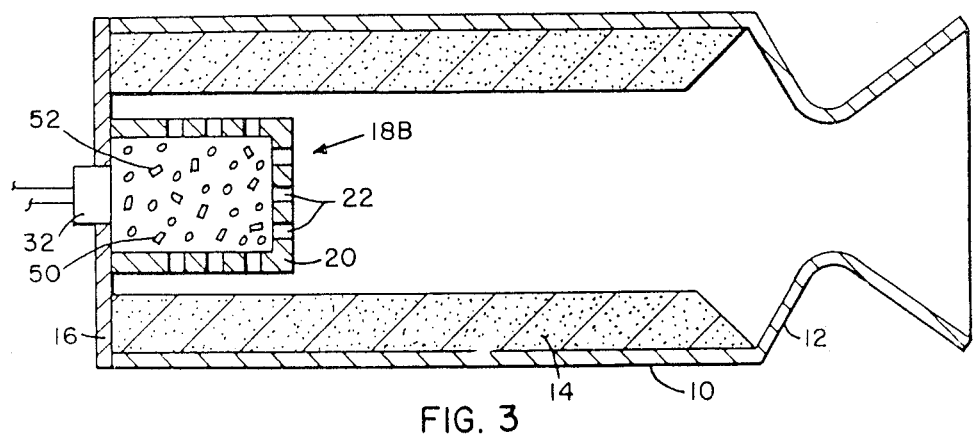
FIG. 3 is a sectional view of a rocket motor with a solid propellant therein and a pyrotechnic igniter with suppressant material and pyrotechnic material intimately disposed in pelletized form in a housing for igniting the main solid propellant charge and for providing suppressant at the same time.
Figure 4:
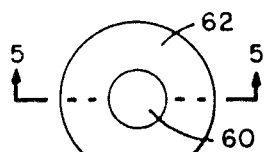
FIG. 4 is an end view of a pyrotechnic pellet and a suppressant material combination arrangement in accordance with this invention.

Referring now to FIG. 3, another embodiment of applicants' invention is illustrated and this embodiment is very similar to that of FIG. 1 except in this embodiment igniter arrangement 18B includes basket 20 with ports 22 therethrough as in FIG. 1 but instead of the suppression material being mounted on the inner surface of basket 20, suppression material 50 in the form of pellets or grains is mixed with the igniter charge pellets or grains 52 that fill basket 20 in this embodiment. The suppressant can be in pellet form separate from the igniter charge pellets, or the suppressant material can be incorporated with the igniter charge in each pellet such as illustrated in FIGS. 4 through 11. Igniter 32 is used to ignite igniter pellets or grains 52 for sustained burning of the igniter arrangement.

In operation of the device of FIG. 3, initiator 32 causes igniter pellets or grains 52 to be ignited and burned to produce gases which cause solid propellant 14 to be ignited and burn in a conventional manner. At the same time propellants or grains 52 are burning, they cause pellets or grains 50 of suppressant material to be ablated and dispensed into the gases produced from main rocket motor propellant 14 in motor structure 10. This ablating suppression material 50 causes afterburning of the gases exiting nozzle 12 to be suppressed and produce the desired results.

In FIGS. 4 through 11, specific structures of pellets in which each pellet contains both suppressant and pyrotechnic or propellant is disclosed. In the pellet illustrated in FIGS. 4 and 5, the pellet includes a suppressant 60 and a pyrotechnic 62 that surrounds the suppressent so that as pyrotechnic 62 burns suppressant material 60 will be ablated. The positions of the pyrotechnic 62 and suppressant 60 can be reversed if desired.

Figure 6:
FIG. 6 is an end view illustrating suppressant particles dispersed throughout the pyrotechnic pellet propellant.
Figure 5:
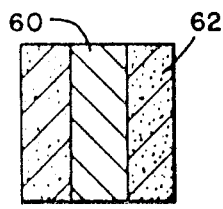
FIG. 5 is a sectional view along lines 5—5 of FIG. 4.
Figure 7:
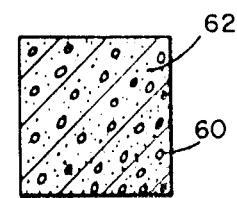
FIG. 7 is a sectional view along lines 7—7 of FIG. 6.
Figure 8:
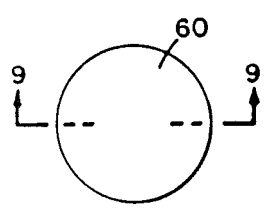
FIG. 8 is an end view of another suppressant and pyrotechnic arrangement in accordance with this invention.
Figure 10:
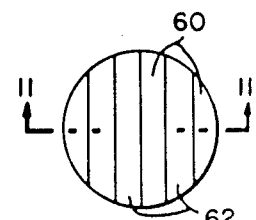
FIG. 10 is an end view of still another arrangement of the suppressant and pyrotechnic in accordance with this invention.
Figure 9:
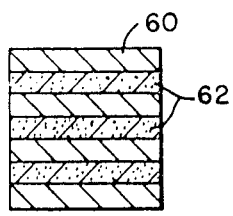
FIG. 9 is a sectional view along line 9—9 in accordance with this invention.
Figure 11:
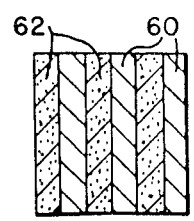
FIG. 11 is a sectional view along line 11—11 of FIG. 10.

In FIGS. 6 and 7, suppressant material 60 is dispersed as small particles throughout the pyrotechnic or propellant material 62. In FIGS. 8 and 9, suppressant material 60 and pyrotechnic or propellant material 62 are in the form of disk like layers and in FIGS. 10 and 11, each pellet has longitudinal layers of alternate suppressant material and pyrotechnic. As can be seen and appreciated, in accordance with this invention the igniter can utilize many and varied configurations in which the suppressant material is in intimate or direct contact with the pyrotechnic or propellant material that has sustained burning to cause the suppressant material to be ablated and despensed into the main rocket motor chamber to mix with the gases from the burning of the main motor solid propellant to suppress after burning of the gases exhausting through the nozzle of the main rocket motor. This specific arrangement of utilizing solid suppressant materials and solid pyrotechnic or propellant material in which the igniter charge burns during the burn cycle of a solid propellant of the main rocket motor provides a very controllable arrangement for depressing afterburning of a minimum smoke solid propellant of the fast burning type that would ordinarily have fuel rich exhaust products that would combust or afterburn with air after they pass the exhaust nozzle or exit of the rocket motor. This afterburning of the rocket motor gases is very much undesirable.

Although the suppressant material $K_2SO_4$ works well in accordance with this invention, other of the known solid state suppressant materials can likewise be used with the device and technique in accordance with this invention. Some of these other solid state suppressant materials include $KHCO_3$, $K_2C_2O_4$, $KBF_4$, Mo metal, $CrCl_3$, tris (2,3-dibromopropyl) phosphate, KF, $Sb_2O_3/NH_4Cl$, $Fe_2O_3$, and Catocene. It is pointed out that not all of the substances listed above are compatible with all propellant or pyrotechic materials. However, the solid state suppressant materials are more compatible with the propellant or pyrotechnic materials in the igniter since the propellant in the sustained igniter does not have all the additives and exotic ingredients that are commonly found in smokeless fast-burning solid propellant of a main rocket motor. Therefore applicants' invention substantially avoids the problem of incompatability between the propellant or pyrotechnic and the ablative material.

It will be appreciated that applicants' invention provides advantages such as the suppressant is not made a direct part of the main motor rocket propellant that provides the thrust and therefore there is no incompatibility problem of the main motor solid propellant with the suppressant, the nature of applicants' device is such that dispensing of the suppressant is at a controlled rate so that very small amounts of the suppressants are efficiently used as required, and the use of small amounts of suppressant further aids in reducing smoke signature and therefore provide motor ballistics that are much more similar to the unsuppressed propellant exhaust.

As previously noted, the ablative action of the suppressant can be effectively accomplished with the suppressant mounted as illustrated in FIG. 1, or such suppressant may be incorporated directly into the igniter pyrotechnic as illustrated in various arrangements such as in the pellets of FIGS. 4 through 11. As illustrated in FIGS. 4, 5, 8, 9, 10, and 11 the suppressant is melted or ablated by being in direct or intimate contact with a pyrotechnic portion of the pyro. Such configurations allow dispensing the present suppressant without degrading the pyro property or performance. In the pellets illustrated in FIGS. 6 and 7, the suppressant particles embedded in the propellant pyro are ejected from the pyro pellet as it burns and these pellets can then be allowed to react in the downstream motor conditions. This configuration illustrated in FIGS. 6 and 7 can have uniform particles or those of varying sizes. The varying sizes allow control of the amount of suppressant throughout the rocket motor burn time history. Other variations of the pellets and the arrangement of the pyrotechnic in direct contact with the ablative material than those illustrated will be appreciated by those skilled in this art and those provided are for illustrative purposes.

We claim:

1. A rocket motor having a rocket motor housing with a forward end and an aft end that has a nozzle mounted thereat, a solid propellant grain of the fast burning and smokeless type mounted in said rocket motor housing between said forward and aft ends, a sustained action igniter means mounted within said rocket motor housing at the forward end for igniting said solid propellant grain to cause the solid propellant grain to produce combustion gases, said igniter means including support structure that surrounds and mounts pyrotechnic material and solid suppressant ablative material in direct contact with one another and contained therein, said solid suppressant ablative material acting when ablated to suppress burning of fuel rich gases from said solid propellant grain, and said structure having means therein for allowing gases produced therein to be communicated into the main rocket motor chamber, and initiater means provided for igniting the pyrotechnic material.

2. A rocket motor as set forth in claim 1, wherein said support structure includes a basket shaped support structure with openings therethrough to allow gas to communicate therethrough, said solid suppressant ablative material being mounted on an inner surface of said basket shaped support with ports through the solid suppressant ablative material which communicate with the openings of said basket shaped support structure and said pyrotechnic material being contained in direct contact with said suppressant material by being positioned in a chamber defined by said suppressant material.

3. A rocket motor as set forth in claim 1, wherein said igniter means is in the form of a small rocket motor structure with a nozzle with solid suppressant ablative material dispersed throughout the pyrotechnic material that is mounted in said small rocket motor structure.

4. A rocket motor as set forth in claim 1, wherein said support structure is basket shaped and mounted at the forward end of said rocket motor housing with said solid suppressant ablative material and said pyrotechnic material being in pellet form and contained in said basket shaped structure.

5. A rocket motor as set forth in claim 4, wherein said solid suppressant ablative material and said pyrotechnic material are each contained in each pellet.

* * * * *